April 22, 1924.

W. D. LOWE

SPRING STRUCTURE

Filed Aug. 15, 1921

1,491,714

Inventor
Willard D. Lowe

By
Attorney

Patented Apr. 22, 1924.

1,491,714

UNITED STATES PATENT OFFICE.

WILLARD D. LOWE, OF COLUMBUS, OHIO.

SPRING STRUCTURE.

Application filed August 15, 1921. Serial No. 492,470.

*To all whom it may concern:*

Be it known that WILLARD D. LOWE, a citizen of the United States, residing at Columbus, in the county of Franklin and State of Ohio, has invented certain new and useful Improvements in Spring Structures, of which the following is a specification.

This invention relates to improvements in the spring construction of motor vehicles, and has particular reference to vehicles of the type employing a front spring construction for resiliently mounting the frames thereof, which extends longitudinally and parallel with the front axle constructions of such vehicles, the primary object of the invention being to provide an improved spring mounting and construction for vehicles of this nature which will afford a spring structure of maximum size which will extend substantially throughout the length of the axle and to be connected with the ends of the axle in such manner that the spring will serve to readily absorb shock and jar imparted to the vehicle and to generally enchance its riding qualities and comfort.

For a further understanding of the invention, reference is to be had to the following description and to the accompanying drawing, in which similar characters of reference denote like and corresponding parts throughout the several views thereof.

Figure 1:
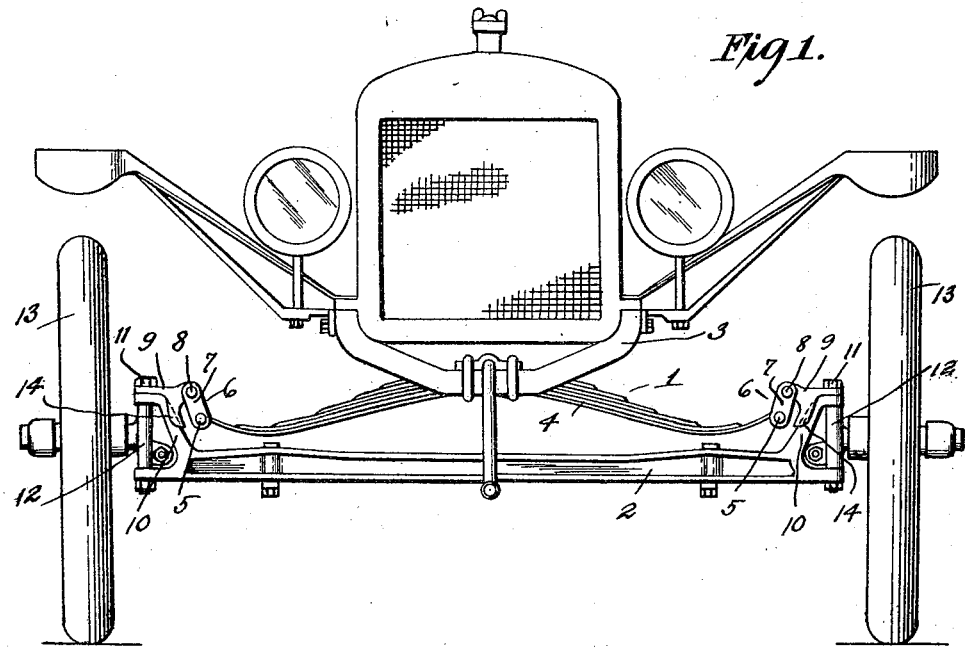
Figure 1 is a front elevation of a motor vehicle provided with the improved spring structure comprising the present invention.
Figure 2:
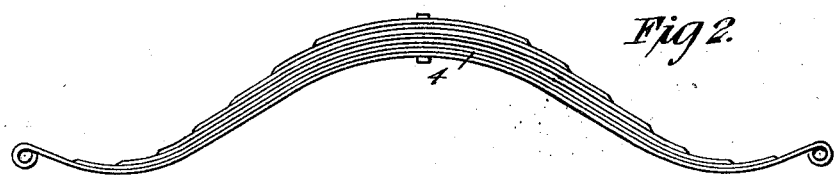
Figure 2 is a view in front elevation of the spring structure itself.
Figure 3:
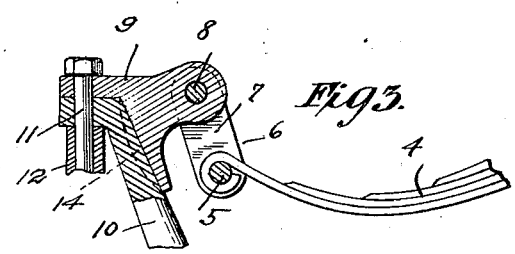
Figure 3 is an enlarged sectional view taken through the construction for connecting the spring structure with the axle of a motor vehicle.

Referring more particularly to the details of the invention, the numeral 1 designates the improved spring structure comprising the present invention in its entirety. This structure is adapted for use primarily in connection with the Ford type of motor vehicle and, as shown, is adapted to be positioned between the front axle 2 of such vehicle and the body or frame 3 thereof. The said spring structure includes a plurality of flat superimposed leaf springs 4 which are of varying length so that the maximum thickness thereof will be located intermediately of the length of the spring structure and at the point of connection of the latter with the frame 3, the outer portions of said spring structure being reduced in thickness until the spring structure as a whole assumes the thickness of the lower leaf of the spring, this construction being common, of course, in springs of this type and hence no particular claim is made thereof. Heretofore, it has been customary to connect the outer ends of the spring 1 with the front axle 2 at points materially spaced from the outer ends of the axle 2. This manner of attachment is believed to render the forward spring structure of the vehicle too rigid so that when in operation shocks and jars imparted to the axle are too readily transmitted to the body of the vehicle, a fact which is evidenced, to a certain extent, by the use of supplemental shock absorbing devices for the purpose of assisting in providing a better resilient support for the forward part of the vehicle body.

The present invention provides a spring structure which aims to overcome the rigidity or lack of resiliency found in the average spring structure and to enable the vehicle to be comfortably operated without resorting to the use of supplemental shock absorbing devices. To this end, the lower leaf of the spring 1 has its outer ends curved upwardly and connected with the lower pins 5 of a pair of shackles 6, which consist of downwardly extending spaced links 7, which have their upper ends pivoted as at 8 to attaching members 9. These members consist of metallic plates which are adapted to be positioned upon the yoke shaped outer ends 10 of the axle 2, and the said members are apertured to receive the upper ends of the vertically extending bolts 11 of the steering knuckles 12, which carry the usual steering wheels 13. The said members 9 are also provided with downwardly extending lips 14, which engage with opposite sides of the yoke shaped ends 10, so as to prevent undue twisting or shifting of positions on the part of the members 9 when the latter are in use. By this construction, it will be apparent that the spring structure 1 comprising the present invention may be applied to a vehicle of standard construction, without altering the general construction thereof. This may be accomplished by the use of the members 9 which, in this instance, are of a separable nature but it will be understood that it is within the province of the invention to form the ends of the axle 2 so that the shackle members may be directly connected therewith, instead of with the attachable members 9.

By the construction described an improved spring support will be provided for the front end of a motor vehicle, which support will possess a maximum degree of resiliency so that the body mounted thereon will be kept substantially independent of the road movements of the running gear. It will be apparent that by the spring structure described, the axle 2 and the wheels carried thereby may assume various angular positions with respect to the frame of the vehicle without disturbing the normal positions of the latter. The spring structure may be readily lubricated and by reason of the simple construction will not be likely to become out of order so as to occasion repair or to rub frictionally against adjacent parts, a fact which renders the structure substantially noiseless in operation. The spring structure may be readily applied to a vehicle of the type for which it is designed and involves no machine work or skilled mechanical ability to effect its application.

What is claimed is:

1. In a motor vehicle, in combination, a front axle including yoked extremities, a frame, a spring structure between said axle and said frame, attaching members separably yet rigidly carried upon the upper portions of the yoked extremities of said axle, means for maintaining said attaching members against movement on said extremities including spaced lips for embracing the upper portions of the yoked extremity, and shackles pivotally carried by said members and connected with the outer ends of said spring structure.

2. In a motor vehicle, in combination, an axle having yoked extremities, a frame, a spring structure between said frame and said axle extending longitudinally of the axle, attaching plates separably mounted in connection with the extremities of said axle, said plates including horizontal ledges designed to rest upon the upper portions of said extremities, said ledges being apertured to receive the vertical knuckle bolts connected with said axle, said bolts also serving to clamp the attaching plates to said extremities, depending projections formed with said members disposed for engagement with said extremities to prevent rotation of said members, and pivoted shackles carried by said members and connected with the outer ends of said spring structure.

3. The combination with the end fork of an automobile axle and the bolt whereby the steering knuckle is attached to said fork, of a spring-shackle mounting consisting of a bracket seated upon the upper member of said fork and secured in place by means of said bolt.

In testimony whereof I affix my signature.

WILLARD D. LOWE.